United States Patent [19]

Schleiger

[11] 4,263,083
[45] Apr. 21, 1981

[54] BUILDING AND CURING AN INEXTENSIBLE BELT STRUCTURE FOR A TIRE ASSEMBLY

[75] Inventor: Robert L. Schleiger, Lincoln, Nebr.

[73] Assignee: The Goodyear Tire & Rubber Company, Akron, Ohio

[21] Appl. No.: 58,977

[22] Filed: Jul. 20, 1979

[51] Int. Cl.³ .......................................... B29H 17/00
[52] U.S. Cl. ................................. 156/414; 156/126; 264/262; 264/271; 264/326; 425/28 B
[58] Field of Search ........ 156/110 R, 110 CL, 123 R, 156/125, 128, 414–420; 152/330 R, 354, 357, 361, 362; 264/501, 502, 257, 259, 260, 261, 262, 271, 275, 277, 315, 316, 326; 425/28 R, 28 B, 47, 538, 383, 385, 389, 390, 409, 441, 442

[56] References Cited

U.S. PATENT DOCUMENTS

| | | | |
|---|---|---|---|
| 2,253,792 | 8/1941 | Leavenworth | 425/28 B |
| 3,659,976 | 5/1972 | Yavorsky | 425/42 |
| 3,915,788 | 10/1975 | Hirata et al. | 156/403 |
| 3,932,078 | 1/1976 | Ellis | 425/28 B |
| 3,934,968 | 1/1976 | Cicognani | 425/28 B |
| 3,964,864 | 5/1973 | Bliss | 425/28 B |
| 4,027,543 | 6/1977 | Johnston | 74/231 R |
| 4,152,191 | 5/1979 | Olsen | 156/414 |
| 4,184,822 | 1/1980 | Schwabauer | 425/28 B |

Primary Examiner—John E. Kittle

Attorney, Agent, or Firm—T. P. Lewandowski

[57] ABSTRACT

The apparatus incorporates a rigid cylindrical form or mandrel on the outer surface of which a belt structure is built, between a pair of end dams. The radially inward surface of the mandrel is cylindrical and provides a large unobstructed cylindrical opening therethrough. The mandrel is constructed of a multiplicity of axially extending segments which are rigidly locked to and extend between a pair of end rings which provide the edge dams. Upon completing the belt structure, the belt structure together with the rigid mandrel are inserted freely into an annular channel between an outside and an inside curing assembly. The inside curing assembly includes a single cylindrical diaphragm expandable radially into contact with the cylindrical inner surface of the mandrel solely to apply curing heat thereto. The outside curing assembly includes a multiplicity of segments which are moved radially inwardly to engage the outer surface of the belt structure in response to an increase in pressurized heating fluid in a chamber defined by a cylindrical elastomeric diaphragm engageable with the cylindrical outer surface of the multiplicity of segments. The foregoing abstract is not to be taken as limiting the invention of this application, and in order to understand the full nature and extent of the technical disclosure of this application, reference must be made to the accompanying drawing and the following detailed description.

26 Claims, 8 Drawing Figures

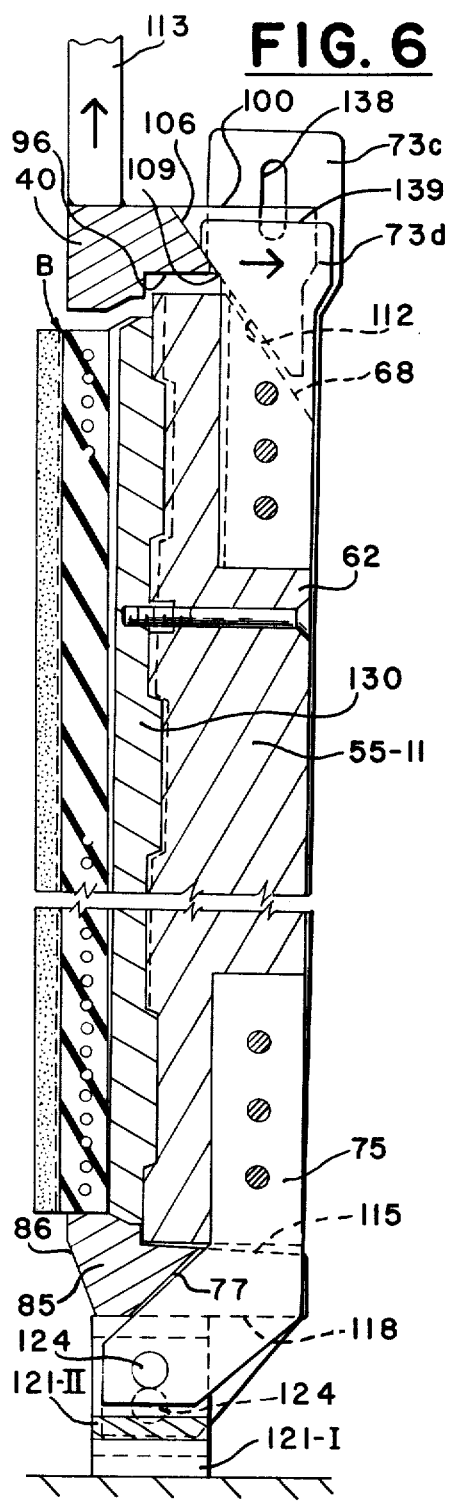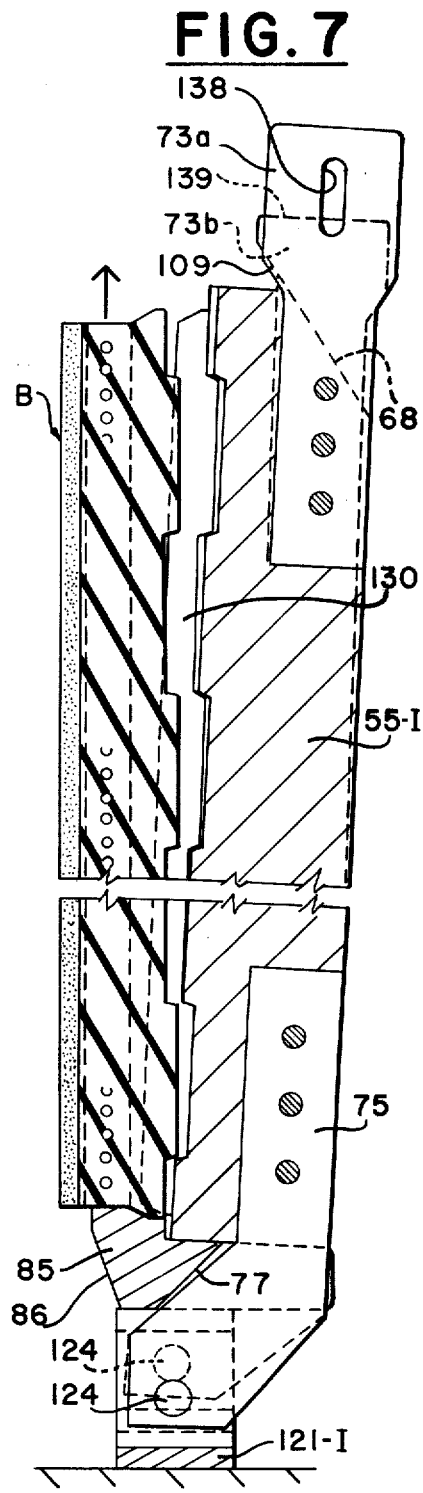

BUILDING AND CURING AN INEXTENSIBLE BELT STRUCTURE FOR A TIRE ASSEMBLY

The present invention relates to building and curing an inextensible belt structure for a tire assembly and particularly to a belt structure to be placed around an already cured toroidal radial ply inflatable tire carcass. Still more particularly, the invention relates to a system of apparatus wherein the belt structure is built completely upon a rigid cylindrical mandrel and is transferred together with the mandrel to curing apparatus to apply heat and pressure to the outer surface of the belt structure which is supported by the rigid mandrel.

Broadly, in one aspect, the invention is accomplished by an apparatus for building and curing an inextensible belt structure for an inflatable tire assemly, the apparatus comprising: mandrel means providing a rigid cylindrical belt building surface and edge dams extending outwardly from said surface respectively at the axial ends of said surface and an axially and circumferentially continuous inner surface providing an unobstructed open cylindrical inner space, said mandrel means including first and second end ring means respectively providing said edge dams, a first and a second plurality of segments extending between and secured to said ring means to form said belt building surface, and curing means for curing a belt structure disposed on said mandrel.

In a further aspect of the invention, there is provided an apparatus for building and curing an inextensible belt structure for an inflatable tire, the apparatus comprising: curing means for applying heat and pressure to said belt structure including a plurality of sets of centripetally movable segments extending coaxially of and arranged about a central axis, each segment of one set thereof having at least one axially and laterally extending portion engaging slidingly in a circumferential direction a portion of the radially inward face of at least one of the respectively adjacent segments of the other set thereof, means for applying heat and pressure to the outward circumferential and axial surface of said plurality of sets of segments, and mandrel means for positioning and rigidly supporting said belt structure in an uncured state in said curing means for curing said belt structure.

In another aspect the invention is carried out by providing an apparatus for building and curing an inextensible belt structure intended to be used in a pneumatic tire assembly, the apparatus comprising: a rigid building mandrel for building said belt structure, said mandrel including a pair of end rings and having between said end rings a cylindrical surface and a pattern of circumferential and transverse grooves sunk radially inward from the cylindrical surface for forming the radially inner face of the belt structure, said mandrel comprising: a multiplicity of pairs of segments disposed to form a rigid hollow cylinder extending axially between and locked to said end rings; curing means for receiving said mandrel with said belt structure built thereon in an uncured state, said curing means comprising a rigid cylindrical wall, a cylindrical elastomeric diaphragm disposed coaxially of and radially inward of said wall, the axial ends of the diaphragm being secured adjacent to the respectively associated ends of the wall, a first and a second plurality of axially extending arcuately spaced segments disposed for movement radially inwardly of said cylindrical wall in response to movement of said diaphragm, each segment of said second plurality of segments having at least one circumferentially extending portion lapping slidably on the radially inward circumferential surface of the next associated one segment of said first plurality of said segments.

To acquaint persons skilled in the arts most closely related to the present invention, certain perferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
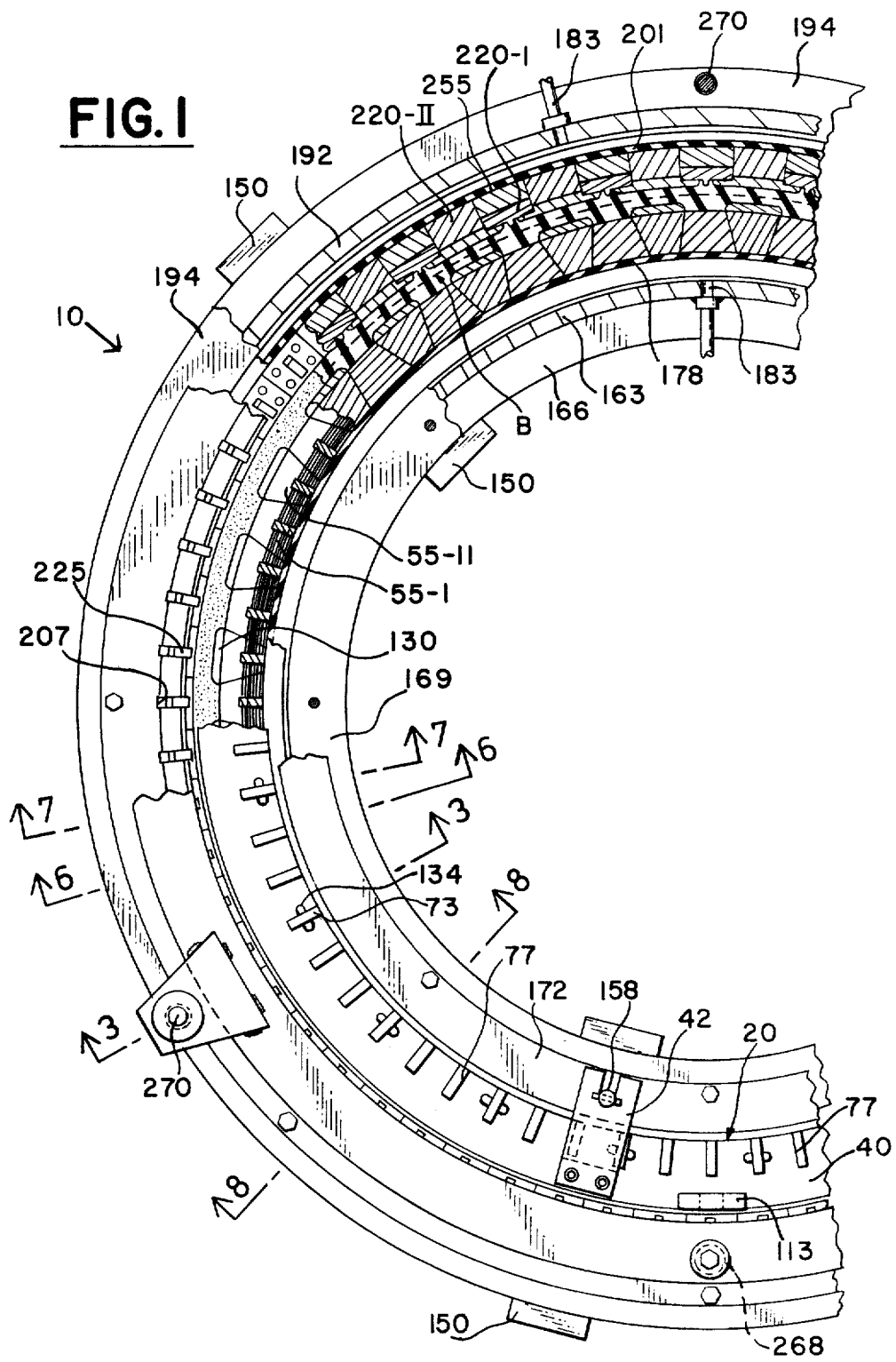
FIG. 1 is a plan view showing an apparatus for curing an inextensible belt structure in accordance with the invention, with portions of the apparatus being broken away to show interior details.
Figure 2:
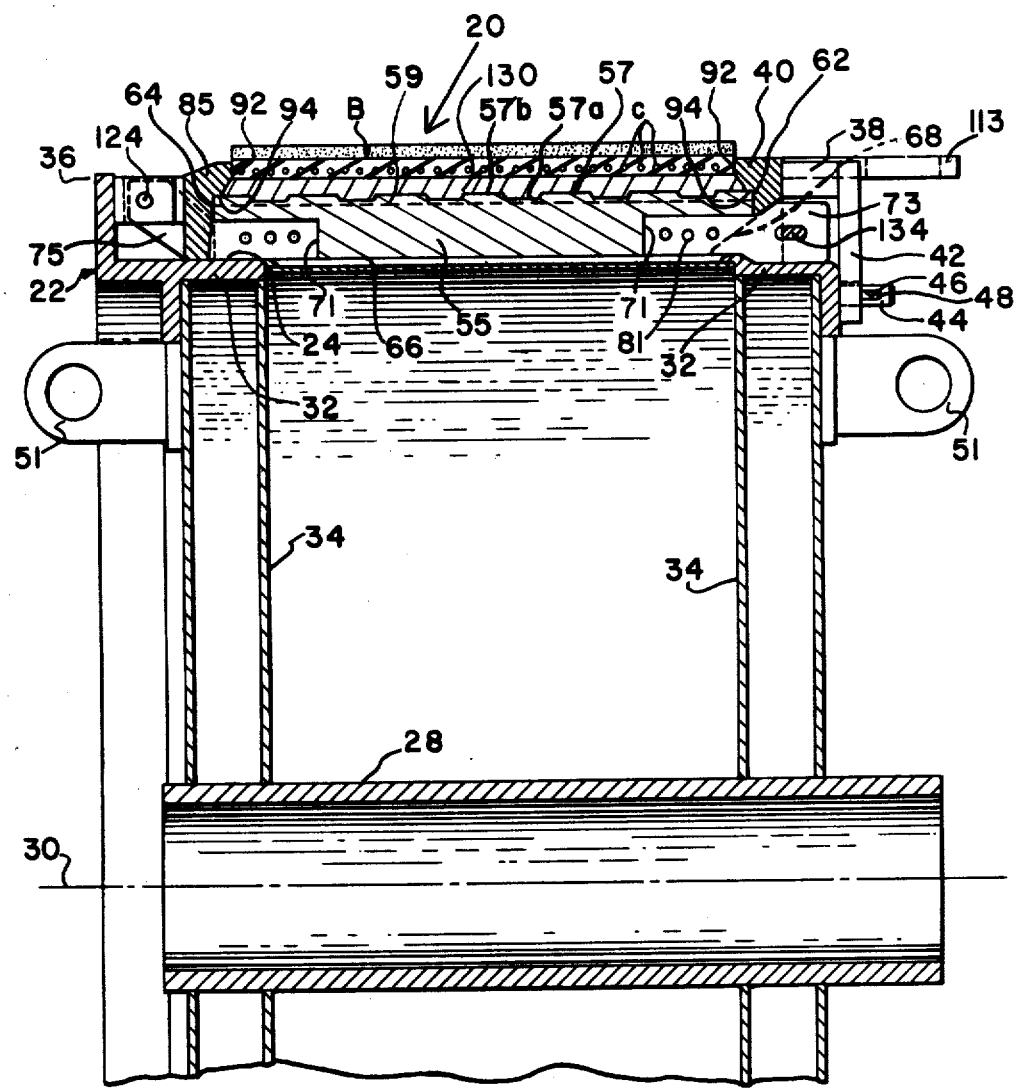
FIG. 2 is an elevation view in axial section of a part of the apparatus of FIG. 1 arranged for building the belt structure to be cured in the apparatus of FIG. 1.
Figure 8:
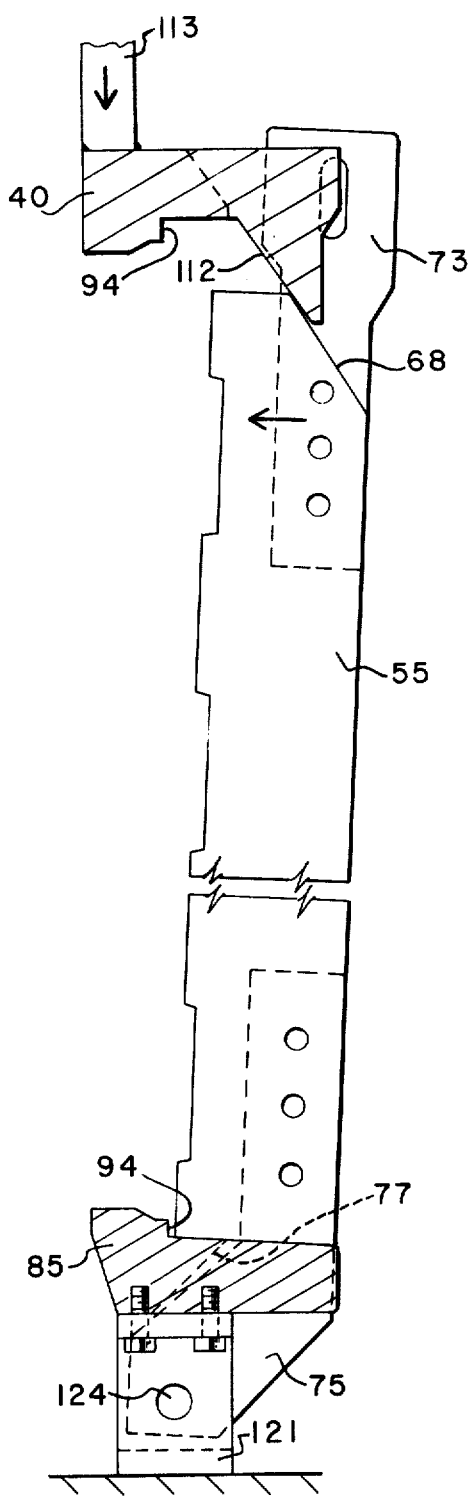

FIGS. 6 and 7 are related section views of the apparatus of FIGS. 1 and 2 taken respectively at the section lines 6—6 and 7—7 of FIG. 1;

FIG. 8 is a section view of the apparatus of FIGS. 1 and 2 taken respectively at the section line 8—8 of FIG. 1.

Figure 3:
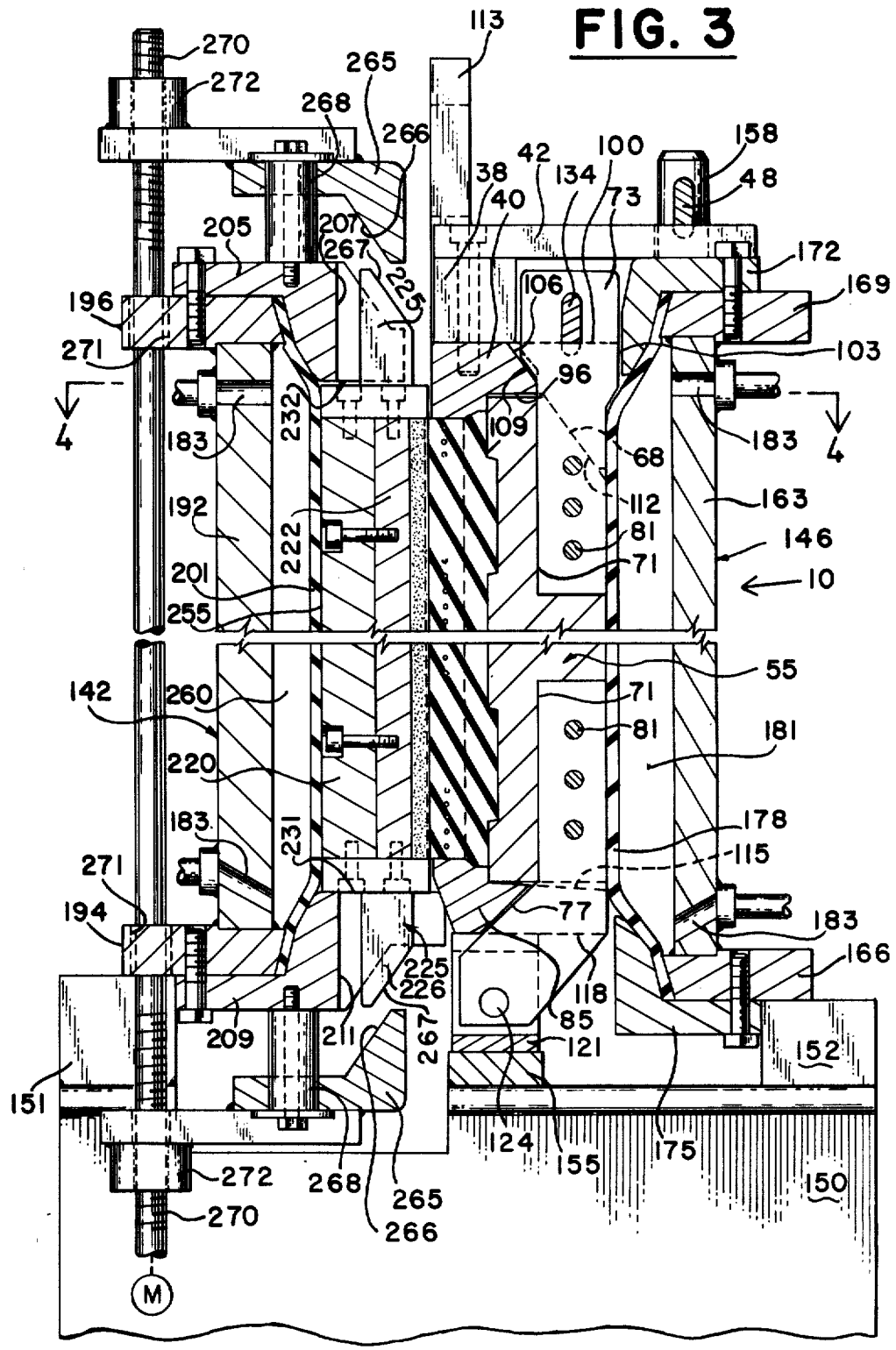
FIG. 3 is an elevation view of a half axial section of the apparatus of FIG. 1 as seen at the section line 3—3 in FIG. 1.

The apparatus system shown in the drawings includes the curing assembly 10, FIGS. 1 and 3. The mandrel 20 shown in FIG. 2 set up for building an inextensible belt structure thereon also forms a part of the curing assembly.

To build the belt structure, the mandrel is placed coaxially on support means provided by a drum 22 having a rigid cylindrical outer surface 24 and mounted for rotation about a building machine spindle (not shown).

The drum 22 includes a hollow center shaft 26 which is adapted for mounting on the machine spindle for rotation about the central axis 30. The drum shell 32 is fixed coaxially to the hollow shaft by a plurality of pairs of spokes and has a flange 36 extending radially outward at one end which serves to locate axially the building and curing mandrel 20 the inner cylindrical surface of which engages the surface 24 of the shell. A block 38 bolted to the end ring 40 of the mandrel has an inwardly extending leg 42 bifurcated by a slot therein radially of the drum which accommodates a locating driving pin 44 affixed to one of the spokes. The pin has a wedge slot 46 which receives a tapered wedge 48 to lock the mandrel 20 in place axially and circumferentially of the drum 22.

To lift and carry the drum a plurality of pairs of lifting eyes 51 are secured, as by welding, to the respective spokes 34 in the manner shown in FIG. 2.

The mandrel comprises a plurality of segments 55 all of equal axial length which cooperate to provide the building surface 57 which surface can have any selected groove pattern. In the particular embodiment being described the pattern comprises a plurality of circumferential grooves 57a and intervening lands 57b and a plurality of axially extending generally rectangular grooves 59 equally spaced about the circumference of the mandrel. The axial ends 62,64 of the segments define planes perpendicular to the axis of the cylindrical surface of the mandrel. The mandrel also is provided with an uninterrupted cylindrical inner surface 66 and a minimum radial thickness consistent with the desired rigidity.

At the upper, outer end 62 of each segment there is formed a bevel 68, being a portion of the surface of a cone of 35-degree slope, as seen in FIG. 3.

All of the segments have formed axially inwardly from each end and radially outwardly of the inner circumferential surface an elongated slot 71 each of which slots accommodates a selected guide bar 73 or 75 which extends axially outwardly of the segment. Each guide bar is accommodated in a respective one of a plurality of radial slots 77 formed in the respective end rings of the mandrel. The guide bars 73,75 are secured to the segments by bolts 81 extending through the respective slots as seen in FIGS. 2 and 3. The upper guide bars 73 fixed in the upper, bevel ends 62 of the respective segments 55 differ in certain respects from the lower guide bars 75 fixed in the opposing lower ends of the respective segments for purposes to be explained presently.

Referring more particularly to FIG. 2, both the top 40 and the bottom 85 end ring have generally radial surfaces extending outward from the cylindrical building surface, providing the mentioned edge dams 92 which determine the axial width of the belt structure. Both end rings 40,85 also have a short axially extending annular seat 94, the seats engaging the respective ends of the cylindrical surface of the assembled segments 55.

The end rings each have a multiplicity of radially extending slots 77, seventy-four in the present embodiment, each slot in the top end ring 40 being aligned axially with the respectively associated slot in the bottom end ring 85. The upper 73 and lower 75 guide bars in the respectively associated slots retain the segments respectively in axial planes.

Figure 5:
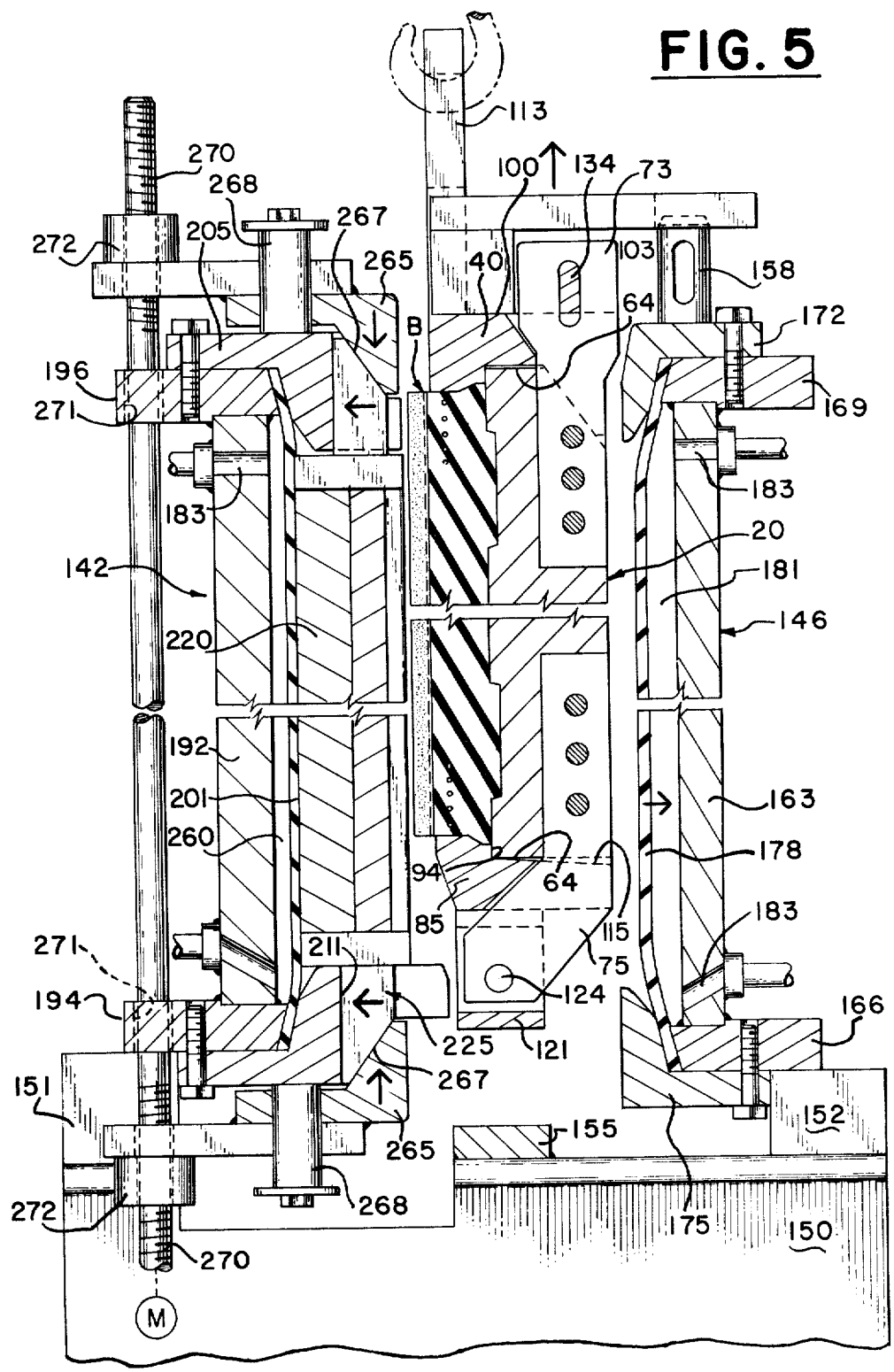
FIG. 5 is a half section view as in FIG. 3, showing the belt structure and mandrel being removed from or placed in the curing assembly.

Referring also to FIGS. 5, 6, and 7, the top end ring 40 has a radial face 96 adjacent the associated ends 62 of the segments. The axially outward face 100 of the ring 40 is in a plane perpendicular to the axis 30 of the mandrel and extends radially inward about equally with the radially inward side 103 of the top end guide bars. The radially outward end 106 of each slot is formed at an angle downward and inward at about 35 degrees with respect to the mandrel axis and cooperates with a shoulder 109 of the guide bar 73 also extending at about 35 degrees confronting and parallel to the end 106 to tilt the segments 55 inwardly as presently will be described in more detail. The respective tongues 112 of the ring 40 formed between adjacent pairs of slots 77 extend at about 35 degrees axially and radially inward confronting and parallel to the bevels 68 and cooperate, as will be shown presently, with the bevels to restore the segments 55 to cylindrical rigid condition. Lifting eyes 113 are fixed on the ring 40 for raising or lowering the mandrel.

The bottom end ring 85 has a radially outward surface 86 chamfered for guiding the mandrel into position relative to the curing assembly as the mandrel is lowered, FIG. 5, into the annular space therein. From the annular set 94 receiving the associated ends 64 of the segments 55 is a radially inward extending face 115 inclined at about 2 degrees outwardly with respect to the ends of the segments. The axially outer face 118 of the bottom end ring 85 lies in a plane perpendicular to the mandrel axis.

To anchor the segments 55 to the bottom end ring 85 a plurality of pivot brackets 121 are fixed to the end ring such that each bracket straddles the respectively associated slot 77.

Figure 4:
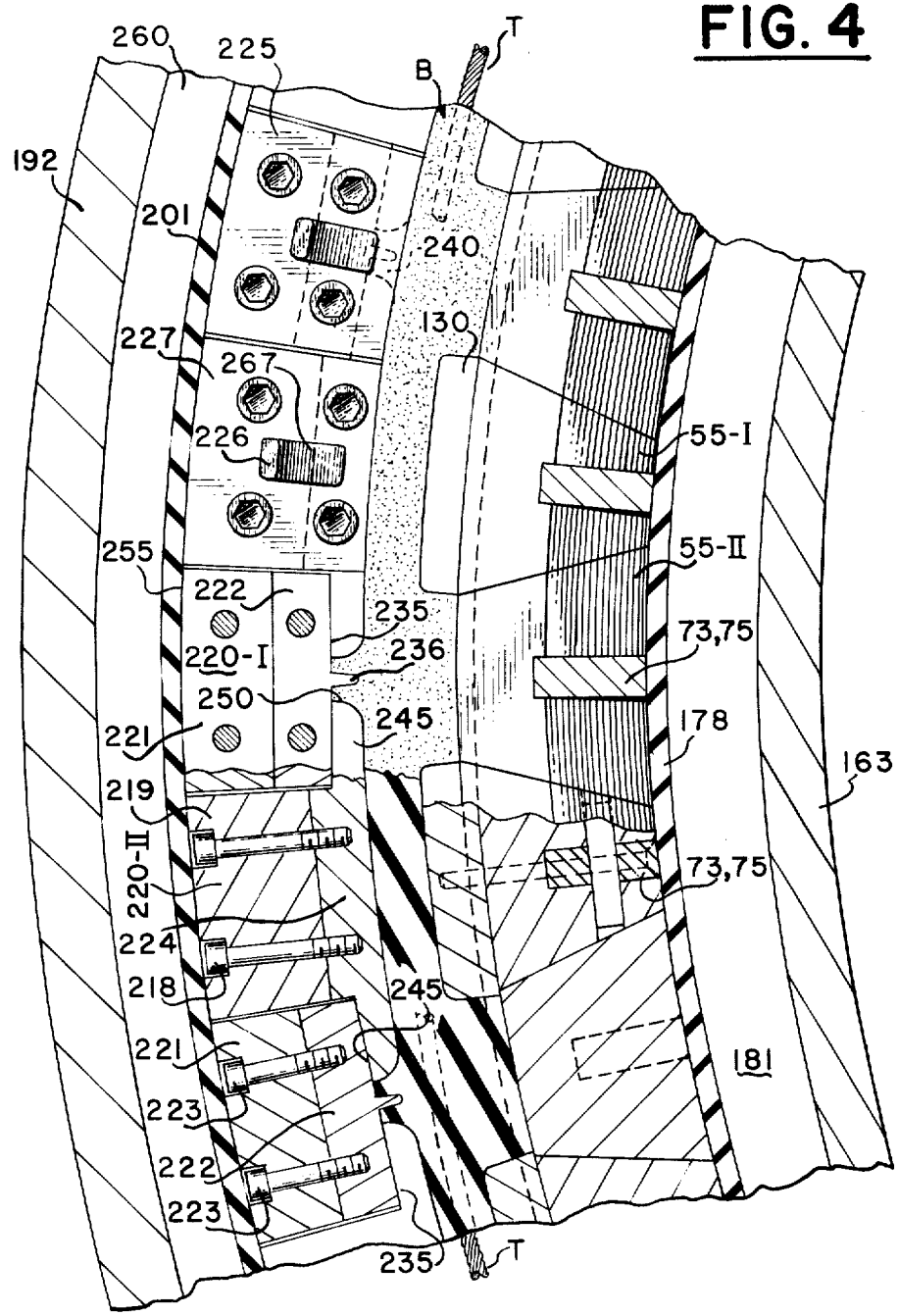
FIG. 4 is an enlargement of a portion of the apparatus of FIGS. 1 and 2 as seen at the section line 4—4 in FIG. 3 with portions broken away to show interior details.

The segments 55 of the mandrel comprises two groups, namely, the groups I and II. The segments of group I, designated 55-I, FIG. 4, are trapezoidal in cross-section, the slant sides thereof being convergent radially outwardly while the segments of group II, designated 55-II, are also of trapezoidal cross-section but the slant sides of which converge radially inwardly. The segments of group I alternate circumferentially with segments of group II. The lower guide bars 75 of the segments of group I are secured to the brackets 121-I for tilting movement by the pivot pins 124 therethrough carried by the associated pivot brackets. The segments of group II are similarly anchored to the associated pivot brackets 121-II, the pivot pins of group II being located closer to the axially outward face 118 of the end ring 85 than are the pins of the group I segments 55-I. The difference in elevation of the pivot pins (compare FIG. 6 and FIG. 7) allows the tilting movement of the segments, later to be discussed therein to result in greater radially inward movement of the lower ends of the segments of group I than of the segments of group II.

To provide axially extending, that is, transverse grooves in the belt, each to accommodate a keeper member to which a track element or grouser bar can be attached, in the present embodiment the segments of group II each have secured thereon a groove form bar 130.

It should be noted that all of the segments 55 are anchored, that is, permanently affixed to the bottom end ring 85 by means of the pivot pins 124 while the top end ring 40 is releasably secured, or locked, by means of a tapered wedge 134 driven in each of the wedge slots 138 of certain ones of the associated guide bars 73 to seat on the face of the ring so as to fix the ring and the segments rigidly together. To unlock the wedges are removed.

The curing assembly 10 referring particularly to FIG. 3 comprises the mandrel 20 as described, with an outer 142 and an inner 146 curing assembly. The assembly 10 includes three pedestals 150 conveniently of I-beams of structural steel. Both the outer and the inner curing assemblies are secured, e.g. bolted, respectively, to pads 151,152 fixed on the pedestal.

When in the curing assembly, the mandrel is supported by the pads 155 fixed on the pedestals, the pads engaging the respectively associated pivot bracket 121 so as to position the mandrel axially within the curing assembly. The previously mentioned block 38 is then secured by placing a wedge key 48 in the tapered wedge slot of the pin 158 which is welded to the clamp ring 172 of the inner assembly 146.

The inner assembly comprises an inner cylindrical wall 163 extending between a lower flange 166 supported on the pads 152 and an upper flange 169. The upper clamp ring 172 is bolted to the upper flange and a lower clamp ring 175 is bolted to the lower flange 166. A cylindrical elastomeric diaphragm 178 has its respective circular edges clamped between the upper end flange 169 and the upper ring 172 and between the lower end flange 166 and the lower clamp ring 175 so as to form with the wall a fluid-tight chamber 181.

To provide heat to the belt structure to cure the same, steam or like heating medium at suitable temperature and pressure, by way of inlet and outlet ports 183 in the wall, expands the diaphragm into heat transfer contact with the cylindrical inner surface 66 of the mandrel. It should be noted, however, that the mandrel 20, being rigid in its cylindrical building condition is not moved by the pressure within the chamber. The diaphragm, being shown in its expanded heat transfer state is, in the absence of a heating fluid medium in the chamber, relaxed to move radially inwardly away from the inner surface of the mandrel.

The radially outward surfaces of the respective clamp rings 158,175 are spaced radially inwardly a small fraction of an inch from the respectively associated portions of the cylindrical inner surface 66 of the mandrel and may assist in guiding the mandrel into position as the same is placed in the assembly 10, FIG. 5.

The outer curing assembly 142, referring to FIGS. 3 and 4, comprises an outer cylindrical wall 192 extending coaxially between a bottom flange 194 supported on the pedestal pads 151 and a top flange 196. An outer cylindrical elastomeric diaphragm 201 has its upper circumferential edge clamped between the top flange and a top clamp and guide ring 205 having a multiplicity of radially extending slots 207. The lower circumferential edge of the diaphragm is clamped between the bottom flange and the guide and clamp ring 209 which has a like plurality of radially extending slots 211. The slots of the respective guide and clamp rings are arranged in axially aligned pairs.

The notable feature of the assembly is a plurality of axially extending circumferentially arranged outer segments 220. The plurality of segments includes segments of type I and segments of type II; all of the segments 220 are of equal length and each has affixed to each end thereof a guide member 225 the axially elongated portion 226 of which are slidable radially in the respectively associated slots of the upper 205 and the lower 209 rings.

The plate portions 227 of the guide members associated with the lower ring 209 rest slidably on the axially inward bearing face 231 of the ring. The plate portions 227 associated with the upper ring 205 are freely slidably radially along the bearing surface 232. The segments 220 are thus located axially in the assembly.

The outside segments 220 of type I, designated 220-I, are trapezoidal in cross-section having slant sides which converge radially inwardly of the assembly and a plane surface 235 extending axially and circumferentially of the assembly and can be provided, as in FIG. 4, with an axially and radially extending tongue 236 for forming a narrow groove or sipe in the associated transverse seal member 240 of the belt B. The respective seal members, of uncured rubbery material, is affixed, as best seen in FIGS. 1 and 4, to the belt structure B during the building operation. The seal members later provide dirt seals between adjacent pairs of grouser bars subsequently mounted on the belt structure after its curing. Segments of type II, designated 220-II, as best seen in FIG. 4, extend radially inwardly beyond the surface 235 of the adjoining segments of type I. Each segment of type II has a pair of flanges 245 which respectively slidingly overlap portions of the plane surface 235 of the two adjoining segments of type I. The circumferential dimension of the segments of type II corresponds essentially to the dimension of the track member or grouser bar subsequently to be secured on the belt structure B. The circumferentially extending flanges 245 which overlap the adjacent segment of type I terminate to form axially extending grooves 250 which accommodate the respective seal members 240.

A noteworthy feature of the curing assembly is that the flanges 245 of the segments 220 of type II, by being slidable circumferentially of the respectively adjacent segments 220 of type I are and remain in slidable contact throughout radial movements of the segments inward or outward and do not open radially extending spaces between adjacent segments, thus the plurality of segments can readily accommodate tolerable variations in the radial thickness of the belt structure without any undesirable effect.

The circumferential and axial outward surface 255 of the plurality of segments is cylindrical and smooth to afford good heat transfer contact with the outer diaphragm 201.

To move the outer segments into heat transfer contact with the outside surface of the belt, the chamber 260 defined by the outer cylindrical wall and the diaphragm is suitably pressurized by a heating pressurizing medium such as compressed air and steam, the segments 220 being moved radially and into pressure contact with the belt. After the desired curing time has elapsed, the segments are moved radially outwardly by a pair of cam rings 265 which can moved equally and coaxially toward one another being guided by the bushings 268 so that the coned surfaces 266 of the respective rings engage the corresponding slant surfaces 267 of the guide members 225 to cause the segments to move radially outward away from the belt structure.

To effect movement of the cam rings, a plurality of screws 270 having righthand and lefthand threaded portions are rotatably accommodated in suitable bores 271 in the flanges 194,196. Each cam ring carries a nut 272 threadedly engaging the appropriate threaded portion of the screw such that the cam rings are moved coaxially, equally, and oppositely, in response to rotation of the screws. The plurality of screws are driven in timed relation by any suitable means known in the arts.

The tread belt or track belt B, FIGS. 1 and 3, for an inflatable tire assembly, is when cured in the apparatus of the invention generally cylindrical in form and of considerable width. The belt structure is made circumferentially inextensible by winding single inextensible high tensile strength member of cord, wire, or cable, a plurality of turns about the mandrel of the apparatus. The high tensile member T is embedded in the belt structure which includes covering of rubbery compounds both inside and outside the cylindrical array of the continuously wound member which are applied to the mandrel in uncured state and not removed from the mandrel until the curing of the rubbery compound has been accomplished. It is a particular aim of the present invention that the rubbery compounds undergo a minimum of movement or displacement from the original placement of the parts of the belt structure during building. Belt structures, FIG. 4, to which the present apparatus is directed have a plurality of transverse lands spaced circumferentially and protruding radially inwardly from the inner surface as well as a plurality of circumferentially extending grooves and lands, FIG. 2. Both transverse and circumferential protrusions of suitable form define means for locating and securing the belt structure with respect to the crown portion of an inflatable tire carcass.

It is desired that the tensile member embedded in the belt structure not be subjected to any displacement from the arrangement laid down during the building operation.

Both the transverse and the circumferential grooves in the building surface of the mandrel conform dimensionally to the respective axial and circumferential lands of the inner face of the belt structure.

The building of the belt structure on the mandrel 20 includes placing in the respective grooves 57a, 59 precut strips of uncured rubbery compound such that the grooves of the mandrel building surface are at least substantially filled to a level cylindrical surface. A selected number of piles of calendered rubbery material, one or more plies of which may be reinforced with suitable bias-laid filamentary material, are then successively applied about the mandrel. A high tensile steel cable enveloped by uncured rubbery compound and forming the high tensile member is then wound snugly about the mandrel in a uniform closely spaced multiplicity of convolutions forming a cylindrical array c as illustrated in FIG. 2 which array is then covered by an additional plurality of calendered plies of suitable rubbery material, one or more of which plies can include a bias-laid filamentary material, such that the composite belt structure B completely fills the annular space defined between the circumferential edge dams and to a radial extent about equal to the radial extent of the respective edge dams.

Optionally but preferably, uncured rubbery material forming the transverse seal members 340, seen in FIG. 4, are applied to the outer periphery of the belt structure and become integral therewith.

The belt structure B so built together with the rigid mandrel 20 on which it is built is then removed from the building station, and upended, whereupon the belt structure and the mandrel together are inserted in the annular space provided in the curing apparatus 10 to undergo the appropriate cure of the belt structure.

Upon completion of the curing time period, the outer segments 220 are retracted by cam ring and screw arrangement as described, both diaphragms being moved radially away from the belt structure therebetween. The mandrel having the cured belt structure B thereon is removed from the curing apparatus and placed on the floor or like plane horizontal surface.

It should be noted that from the initiation of the building process until the completion of the curing period of the belt structure, the mandrel is not in any way moved relatively of the belt structure. Having been cured, the belt structure must now be removed from the mandrel.

To release the belt structure from the mandrel after cure, referring also to FIGS. 6 and 7, the wedges 134 are removed from the corresponding locking slots 138 of the upper guide bars 73. The top end ring 40 is then lifted coaxially from the segments 55. As the ring is lifted, the 35-degree surface 106 in the respective slots of the ring 40 interacts first with the corresponding 35-degree surface of the segment guide bar shoulders 109 of type I so as to cause the type I segments to tilt angularly about their anchorage at the pivot pins 124 fixed in the brackets 121-I of the bottom end ring. In the present apparatus, there are seventy-four segments which cooperate to form the mandrel. Of the seventy-four, ten segments of type I are provided with the guide bars 73a having wedge locking slot 138 and each with a 35-degree shoulder 109 disposed to interact first with the top end ring as the latter is lifted from the segments. These bars 73a are spaced apart about circumferentially of the mandrel. An additional twenty-seven of the type I segments have guide bars 73b essentially identical to the group of ten but for the portions accommodating the wedge slots 138. These twenty-seven guide bars 73b terminate at a plane end 139 about flush with the face 100. Thus, all the segments of type I can be tilted about their respective pivot pins to some extent before initiation of the tilting of the segments of type II.

Eleven of the type II segments are provided with guide bars 73c each having a wedge slot 138 for the receipt of a locking wedge 134, and twenty-six of the type II segments have upper guide bars 73d which terminate at or slightly above the axially outward face 100.

To ensure that the plurality of segments 55-I begin to move inwardly before the segments 55-II of group II, the guide bar shoulders 106 of the latter, group II, are arranged to delay the start of tilting inward of the segments 55-II. The shoulder 109 of the guide bars 73a, 73b which are fixed in the segments 55-I of the group I, disposed at 35 degrees as described, closely confronts the 35-degree slope 106 of the slots 77.

The delay in initiation of the tilting action of the segments of type II is provided by spacing the 35-degree sloped surface of the shoulders 109 of the latter bar segments 73c, 73d upwardly by 0.10 inch so as to be engaged later by the 35-degree slope 106 of the top end ring as the latter is lifted from the segments 55.

To anchor the respective segments of the mandrel, a U-shaped pivot bracket 121 straddles each slot 77 of the bottom end ring 85 to accommodate the lower segment guide bar 75. In order that the segments 55 of type I can be moved radially inward sufficiently farther than the segments of type II to avoid interference at the respectively associated lower ends 64, the pivot pins 124 associated with the segments of type II are located closer to the axially outer face 118 of the bottom end ring than are the pins associated with the segments of type I.

When the top end ring is completely removed and set aside, the respective segments of the mandrel have been tilted angularly inwardly of the belt structure at their top ends accompanied by a lesser inward movement at their lower ends. The tilting inward of all the segments is sufficient so that the now cured belt structure can be lifted coaxially upward from the mandrel.

To restore the mandrel, referring also to FIG. 8, to its rigid cylindrical state, the top end ring is lowered coaxially of the bottom end ring 85 such that the 35-degree sloped surface of the tongues 112 in the end ring engage the 35-degree bevel 68 of the respective segments to tilt the segments outwardly about the respective pivot pins and to bring the segments respectively into seated engagement with the annular seats 94 of the respective end rings. The respective locking wedges 134 are then inserted in the wedge slots 138 of the upper guide bars and the mandrel is again placed on the drum 22 to build the next belt structure.

The outer segments 220 can, referring again to FIG. 4, conveniently be fabricated in two parts, a base portion and a belt-engaging portion. As best seen in FIG. 4, the base portion 221 of each segment 220-I, and the belt-engaging portion 222 thereof are secured together as a unit by the bolts 223. The base portion 219 and the belt-engaging portion 224 of each segment 220-II are similarly secured together by bolts 218. The versatility of the outer curing assembly is thereby increased.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for building and curing an inextensible belt structure intended to be used in a pneumatic tire assembly, the apparatus comprising:

a rigid building mandrel for building said belt structure, said mandrel including a pair of end rings and having between said end rings a cylindrical surface and a pattern of circumferential and transverse grooves sunk radially inward from the cylindrical surface for forming the radially inner face of the belt structure, said mandrel comprising:

a multiplicity of pairs of segments disposed to form a rigid hollow cylinder extending axially between and locked to said end rings;

curing means for receiving said mandrel with said belt structure built thereon in an uncured state, said curing means comprising a rigid cylindrical wall, a cylindrical elastomeric diaphragm disposed coaxially of and radially inward of said wall, the axial ends of the diaphragm being secured adjacent to the respectively associated ends of the wall, a first and a second plurality of axially extending arcuately spaced segments disposed for movement radially inwardly of said cylindrical wall in response to movement of said diaphragm, each segment of said second plurality of segments having at least one circumferentially extending portion lapping slidably on the radially inward circumferential surface of the next associated one segment of said first plurality of said segments.

2. An apparatus as claimed in claim 1, further comprising a guide ring fixed adjacent each axial end of said cylindrical wall each guide ring having a multiplicity of equally angularly spaced slots open axially therethrough and open radially inward thereof and having a planar annular surface, each of said segments having fixed at each of its axial ends, a guide member having a planar surface slidably engaging the annular surface of the associated guide ring and an elongated portion slidably received in a respective one of said slots.

3. An apparatus as claimed in claim 2, each said guide ring and the respectively associated end of said cylindrical wall cooperating to clamp pressure-tightly the respective end of said diaphragm, and port means in said wall for accommodating flow of pressured fluid to move said diaphragm inwardly radially of said wall.

4. An apparatus as claimed in claim 2, each said guide member elongated portion having a slant surface, a pair of cam rings mounted respectively above and below and for movement coaxially of said segments in a first direction away from the associated guide members to permit said segments to move radially inward in response to movement of the diaphragm and in the opposite direction into sliding engagement with each said slant surface to cause said segments to move radially outwardly toward said cylindrical wall, and screw means on said cylindrical wall operable to move said cam rings equally and oppositely coaxially to and away from said guide members.

5. An apparatus as claimed in claim 1, said curing means further comprising an inner cylindrical wall, a pair of clamp rings removably affixed to the respective ends of said inner cylindrical wall, a second elastomeric diaphragm having its axial ends secured to the respective axial ends of said inner cylindrical wall by said clamp rings, and port means in said inner cylindrical wall for accommodating the flow of heating fluid to said diaphragm to expand said diaphragm to heat transfer contact with said rigid mandrel while the mandrel is disposed coaxially therearound.

6. Apparatus for building and curing an intextensible belt structure for an inflatable tire assembly, the apparatus comprising:

mandrel means providing a rigid cylindrical belt building surface and edge dams extending outwardly from said surface respectively at the axial ends of said surface and an axially and circumferentially continuous inner surface providing an unobstructed open cylindrical inner space, said mandrel means including first and second end ring means respectively providing said edge dams, a first and a second plurality of segments each extending axially between and secured to said ring means to form said belt building surface, and curing means for curing a belt structure disposed on said mandrel means.

7. An apparatus as claimed in claim 6, further comprising anchor means permanently connecting said first end ring means to said segments and lock means releasably connecting said second end ring means to said segments.

8. An apparatus as claimed in claim 7, said anchor means including first guide bar means fixed in each segment and extending axially outward therefrom, and pivot pin means fixed on said first end ring means and respectively securing said segments in tiltable anchored relation with said first end ring means.

9. Apparatus as claimed in claim 7, said lock means comprising second guide bar means fixed in each segment and extending axially outward therefrom, selected ones of said second guide bar means having wedge accommodating slots therethrough, and a plurality of wedges inserted respectively in said slots and engaging said second end ring means.

10. Apparatus as claimed in claim 7, further comprising tilting means for tilting said segments radially inward angularly about said anchor means including a plurality of guide bar means fixed respectively in each segment and extending axially outward therefrom, said second end ring means having a multiplicity of radial slots respectively accommodating said guide bar means for movement radially of said ring means, each said radial slot having a face sloped axially and radially inward, each said guide bar means having a shoulder disposed in said slot and sloped axially and radially outward of the proximate end of the associated segment, whereby coaxial movement of said second end ring means away from said plurality of segments displaces the associated ends of said segments radially inwardly.

11. Apparatus as claimed in claim 7, further comprising restoring means for moving said segments radially outward angularly about said anchor means, said restoring means including coned face portions on said second end ring means and beveled faces on said segments slanting radially and axially inwardly from the proximate ends thereof and confronting said coned face portions of said second end ring means while said mandrel is in its rigid cylindrical condition, whereby coaxial movement of said second end ring means to engagement with the proximate ends of said segments causes outward movement of said proximate ends thereof.

12. Apparatus as claimed in claim 8, 10, or 11, said anchor means including a plurality of pivot pin brackets affixed to said first end ring means and extending outward of said ring means away from said segments, each of said brackets having a pivot pin pivotally fixing the associated one of said guide bars, each said pivot pin associated with said first plurality of segments being spaced axially from said first end ring means a first distance and each pivot pin associated with said second plurality of segments being spaced axially from said first end ring means a second distance which is less than said first distance, whereby the radially inward movement of the associated ends of said first plurality of segments is greater than the radially inward movement of the associated ends of said second plurality of segments with respect to said end ring means.

13. Apparatus as claimed in claim 12, wherein said first end ring means includes a rest surface disposed at about two degrees with respect to the plane of the axial ends of said segments, said rest surface engaging the proximate end faces of said segments when said segments are tilted inwardly whereby to limit the angular tilting movement of the segments about said anchor means.

14. Apparatus for building and curing an inextensible belt structure for an inflatable tire, the apparatus comprising:
   curing means for applying heat and pressure to said belt structure including a plurality of sets of centripetally movable segments extending coaxially of and arranged about a central axis, each segment of one set thereof having at least one axially and laterally extending portion engaging slidingly in a circumferential direction a portion of the radially inward face of at least one of the respectively adjacent segments of the other set thereof, means for applying heat and pressure to the outward circumferential and axial surface of said plurality of sets of segments and mandrel means for positioning and rigidly supporting said belt structure in an uncured state in said curing means for curing said belt structure.

15. Apparatus as claimed in claim 14, said plurality of sets of segments cooperating to define an axially and circumferentially continuous outer cylindrical surface, said at least one portion of said segment of said one set thereof slidingly engaging a portion of the radially inward face of said at least one of the respectively adjacent segments of said other set thereof while in said pressure contact with said belt structure and during radial movement of said segments toward and away from said belt structure, whereby spaces between said segments are maintained closed to inhibit mold flash therebetween independently of the radial thickness of said belt structure.

16. Apparatus as claimed in claim 14 or 15, each segment of said one set comprising a base portion and a belt-engaging portion fixed on said base portion, the belt-engaging portion having a pair of axially extending flange portions each extending in a circumferential direction outward of said base portion, each said segment of said other set thereof comprising a base portion disposed between next adjacent pairs of the base portions of said one set and a radially inward belt-engaging face slidingly engaging and partially masked from said belt structure by the flange portions of the respectively adjacent segments of said one set.

17. Apparatus as claimed in claim 14 or 15, said curing means for applying heat and pressure comprising an outer cylinder having axial end flanges secured thereon, an elastomeric cylindrical diaphragm having its axial ends fixed fluid-tightly respectively to said end flanges to form an annular chamber between said outer cylinder and said diaphragm and flow means accommodating flow of pressurized fluid to and from said chamber.

18. Apparatus as claimed in claim 17, further comprising guide rings secured respectively to said end flanges to fix the axial ends of said diaphragm, said guide rings each having a multiplicity of arcuately spaced radially extending guide slots, said slots of the respective rings being aligned in axial pairs thereof, a guide member fixed respectively on and extending axially outward from each end of each of said segments, each guide member occupying respectively one of said slots, said segments being movable radially inwardly of said cylinder in response to increase of pressurized fluid in said chamber.

19. Apparatus as claimed in claim 18, each guide member having a plate portion and an upright portion, said upright portion occupying a respectively associated guide slot, each of said guide rings having a planar bearing surface in a plane normal to the axis of said outer cylinder, said plate portion of each guide member being freely slidable on the respectively associated bearing surface, said planar surfaces being axially spaced to locate said segments axially of said outer cylinder.

20. Apparatus as claimed in claim 15, 18, or 19, further comprising cam means for moving said segments radially outwardly, said cam means including a pair of cam rings having coned surfaces sloped axially and radially inwardly mounted coaxially outwardly respectively of said end flanges, a guide member each having a cam ring engaging surface sloped radially and axially outwardly one guide member being fixed respectively on and extending axially outward from each end of each of said segments, and screw means drivingly connected to said cam rings for moving said cam rings toward each other to engage respectively the cam ring engaging surfaces of the guide members to move said segments radially outward toward said outer cylinder and for moving said cam rings away from each other to disengage said cam rings from said guide members.

21. Apparatus as claimed in claim 6, said first plurality of segments having cross-sections of generally trapezoidal form the slant sides of which converge radially outwardly and said second plurality of segments having cross-sections of generally trapezoidal form the slant sides of which converge radially inwardly, the slant sides of each segment of the first plurality thereof being respectively contiguous with one of the slant sides of each of the next adjacent pair of segments of the second plurality thereof while said mandrel means is in its rigid cylindrical condition, said segments being tiltable angularly inwardly relative to one of said ring means, the first plurality of said segments being tiltable before the segments of said second plurality thereof in response to removal of the other of said end ring means.

22. Apparatus as claimed in claim 21, further comprising insert means fixed on each segment of said second plurality thereof to conform respectively to transverse grooves of said belt structure.

23. Apparatus as claimed in claim 1, further comprising angular alignment means for fixing the relative angular alignment about the axis of said curing means between said means and said mandrel, said alignment means including an index lug having a radially inwardly extending bifurcated portion fixed on said mandrel and an index pin fixed on said wall, said pin engaging the bifurcated portion to align the mandrel angularly about said axis while inserting said mandrel into said curing means.

24. Apparatus as claimed in claim 8, 9, or 10, wherein said second end ring means and guide bar means associated with said first plurality of segments cooperate to begin to tilt said first plurality of segments inwardly in response to coaxial movement of said second end ring means away from said first plurality of segments before said guide bars associated with said second plurality of segments engage said second end ring means to begin to tilt said second plurality of segments inwardly.

25. Apparatus for building and curing an inextensible belt structure for an inflatable tire comprising curing means for applying heat and pressure to said belt structure including a plurality of sets of centripetally movable segments extending coaxially of and arranged about a central axis, each segment of one set thereof being connected by closing means to at least one of the respectively adjacent segments of the other set thereof while in said pressure contact with said belt structure and during radial movement of said segments toward and away from said belt structure whereby spaces between said segments are maintained closed by said closing means to inhibit flash therebetween independently of the radial thickness of said belt structure.

26. Apparatus as claimed in claim 25 wherein said closing means includes a portion of each segment of one set which is engageable with a portion of at least one of the respectively adjacent segments of the other set thereof.

* * * * *